UNITED STATES PATENT OFFICE.

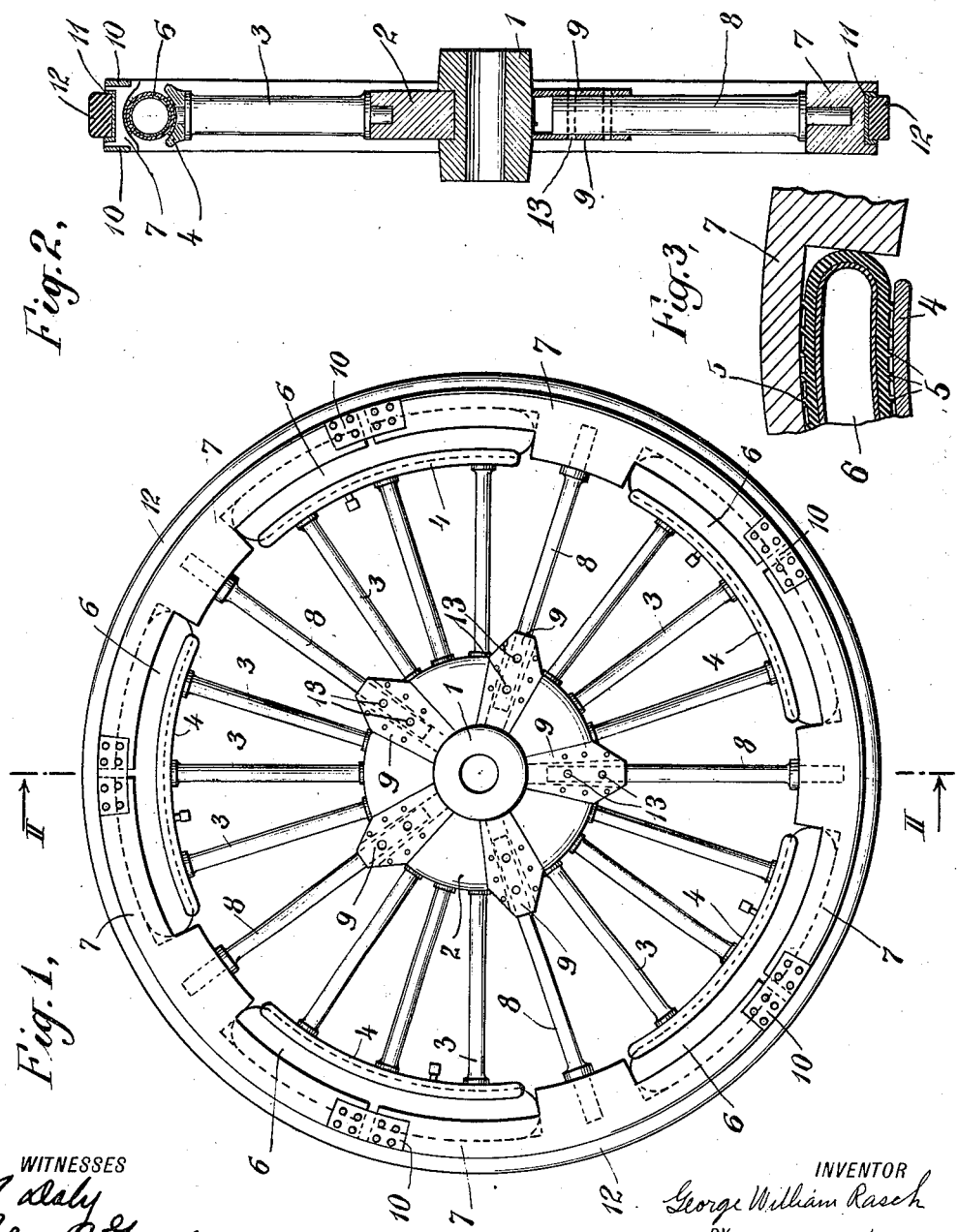

GEORGE WILLIAM RASCH, OF BROOKLYN, NEW YORK.

CUSHIONED WHEEL.

1,178,599.

Specification of Letters Patent. Patented Apr. 11, 1916.

Application filed January 29, 1913. Serial No. 744,847.

*To all whom it may concern:*

Be it known that I, GEORGE WILLIAM RASCH, a citizen of the United States, and a resident of Brooklyn, county of Kings, and State of New York, have invented certain new and useful Improvements in Cushioned Wheels, of which the following is a specification.

My invention relates to cushioned wheels and one object of the invention is to provide a simple and efficient wheel suitably cushioned but which is not subject to puncture as the common wheel with pneumatic tires.

A further object is to provide a wheel with a plurality of cushions in such a manner that if any one of them gives out the wheel is still cushioned by the rest to a very great extent and in which the cushions may be easily replaced.

Further objects, features and advantages will more clearly appear from the detailed description given below taken in connection with the accompanying sheet of drawings which forms a part of this specification.

In the drawings Figure 1 is a side view illustrating a wheel embodying my invention in one form; Fig. 2 is a transverse section thereof taken on the line II—II of Fig. 1; and Fig. 3 shows in section certain details of the pneumatic cushioning means.

Referring to the drawing, the wheel is provided with a hub section comprising a hub 1 having rigid therewith a circular enlargement 2 into which are rigidly fitted five sets of spokes 3, each set comprising three spokes. Each set of three spokes carries at its outer extremity a seat 4, and each seat 4 of the hub section carries a pneumatic cushion 6 much like a section of a pneumatic tire, which may be inflated in the usual manner.

Extending about the hub section is a tread section composed of five separate arc shaped pieces 7, each being provided with a spoke 8 rigid therewith and centrally disposed with respect thereto and lying substantially in the plane of the center of the cushions and tread. The inner ends of these spokes extend slidably into cut away portions in the hub section, the sides of said cut away portions being covered by iron plates 9. The cut away portions are tapered as shown by dotted lines in Fig. 1, in order to permit the inner end of the spokes 8 and the tread section to have a slight movement with respect to the hub section in a plane at right angles to the axis of the wheel. The five sections 7 are rigidly locked together at their ends by iron plates 10 bolted thereto, or the sections 7 may be secured together in any other suitable manner. Extending around the sections 7 is a metallic rim 11 in which rests a solid rubber cushion tire 12. If desired, the pneumatic cushions 6 may be composed of inner and outer tubes, the outer tube having projections or buttons 5 which engage the faces of the members 4 and 7 to prevent these parts slipping with respect to one another, as shown in Fig. 3. In case several of the cushions should give out, or for any other reason it is desired to make the tread section rigid with the hub section, the spokes 8 may be bolted to plates 9 by passing bolts through the holes 13.

From the above it will appear that the wheel is simple, and efficiently constructed. When it is desired to put in a new pneumatic section it is only necessary that the old one be deflated, when it may be easily slipped out between the parts 4 and 7 and a new one quickly inserted and inflated. As it is unlikely that all five cushions would give out on a single trip only one or two of the cushions need be carried, which occupy much less space than the usual pneumatic tire. Furthermore, the giving out of one cushion does not destroy the usefulness of the others and in this respect my improvements are advantageous over pneumatic tires in which if any part is unfit for use the whole tire is rendered useless. Furthermore, even if one of the cushions should give out the other cushions will be found sufficient to cushion the wheel if it is not subjected to too hard usage so that the given out cushion need not be immediately replaced until some convenient place is reached for that purpose. New rims 11 and tires 12 may be easily put in place by unbolting and removing the plates 10, deflating the cushions and pushing the sections 7 inwardly, when the tires may be easily slipped off. After new ones are put in place the cushions may be inflated, which will force the sections 7 outwardly until they firmly engage the tires when the plates 10 may be again bolted in place.

While I have shown my improvements in great detail and with respect to one particular form thereof, nevertheless, I do not desire to be limited to such details except as clearly pointed out in the appended claims, since many changes and modifications may well be made without departing from the spirit and scope of my invention in its broader aspects.

Having fully and clearly described one form of my improvements, what I claim as new and desire to secure by Letters Patent, is:

1. A cushioned wheel comprising a hub section, a relatively movable tread section, cushioning means interposed between the hub and tread sections, a tire extending around the periphery of the tread section said tread section being divided radially into a plurality of sections and having spokes slidably mounted in the hub section whereby the said tread section may be contracted to permit of removal of said tire, and means for holding the plurality of tread sections rigid with one another.

2. A cushion wheel comprising a hub section, pneumatic cushioning means carried thereby, and a tread section extending about and adapted to bear against said cushioning means, said tread section having spokes rigid therewith which extend into the hub of the hub section and have both a radial movement and a slight lateral movement with respect thereto in a plane at right angles to the axis of the wheel and pass between the pneumatic cushioning means.

3. A cushion wheel comprising a hub section, a plurality of independent circumferentially spaced pneumatic cushions, spokes supporting said cushions from said hub section, a tread section extending about and adapted to bear against said pneumatic cushions, said tread section having spokes extending to the hub of the hub section with their inner ends slidably mounted in said hub, said last named spokes being positioned between said first named spokes and lying throughout their length in the same plane therewith.

4. A cushion wheel comprising a hub section and a tread section, a plurality of cushioning means interposed between said sections, said tread section having spokes passing between said cushioning means and having their inner ends slidably mounted in the hub of the hub section, the hub section being shaped to permit both a radial and lateral movement of said spokes with respect thereto in a plane at right angles to the axis of the wheel.

5. A cushion wheel comprising a hub section and a tread section, cushioning means interposed between said sections, said tread section having spokes having their inner ends slidably mounted in recesses in the hub of the hub section, the recesses in the hub being shaped to permit both a radial and lateral movement of said spokes with respect thereto in a plane at right angles to the axis of the wheel.

6. A cushion wheel comprising a hub section and a tread section, a plurality of cushioning means interposed between said sections, said tread section having spokes passing between said cushioning means and extending from the tread section to the hub of the hub section and having their inner ends slidably mounted in the hub.

In testimony whereof, I have signed my name to this specification, in the presence of two subscribing witnesses.

GEORGE WILLIAM RASCH.

Witnesses:
GORHAM CROSBY,
EDWIN SEGER.